United States Patent
Zoldi et al.

(10) Patent No.: US 11,100,506 B2
(45) Date of Patent: Aug. 24, 2021

(54) FRAUD SCORE MANIPULATION IN SELF-DEFENSE OF ADVERSARIAL ARTIFICIAL INTELLIGENCE LEARNING

(71) Applicant: FAIR ISAAC CORPORATION, Roseville, MN (US)

(72) Inventors: Scott Michael Zoldi, San Diego, CA (US); Qing Liu, San Diego, CA (US)

(73) Assignee: FAIR ISAAC CORPORATION, Roseville, MN (US)

(*) Notice: Subject to any disclaimer, the term of this patent is extended or adjusted under 35 U.S.C. 154(b) by 565 days.

(21) Appl. No.: 15/590,921

(22) Filed: May 9, 2017

(65) Prior Publication Data

US 2018/0330379 A1 Nov. 15, 2018

(51) Int. Cl.
*G06Q 20/40* (2012.01)
*G06N 3/08* (2006.01)
*G06N 20/00* (2019.01)
*G06N 3/04* (2006.01)

(52) U.S. Cl.
CPC ....... *G06Q 20/4016* (2013.01); *G06N 3/0454* (2013.01); *G06N 3/08* (2013.01); *G06N 20/00* (2019.01)

(58) Field of Classification Search
CPC .. G06Q 20/4016; G06N 20/00; G06N 3/0454; G06N 3/08
See application file for complete search history.

(56) References Cited

U.S. PATENT DOCUMENTS

| | | | | |
|---|---|---|---|---|
| 5,822,741 A | * | 10/1998 | Fischthal | G06K 9/62 706/16 |
| 7,813,944 B1 | * | 10/2010 | Luk | G06Q 10/10 705/4 |
| 2005/0015454 A1 | * | 1/2005 | Goodman | H04L 51/12 709/207 |
| 2007/0067839 A1 | * | 3/2007 | Hamada | H04L 63/1458 726/22 |

(Continued)

FOREIGN PATENT DOCUMENTS

WO WO-2012058066 A1 * 5/2012 ............. G06Q 40/02

OTHER PUBLICATIONS

Skillicorn, D. (e-published Oct. 21, 2010). "Computational approaches to suspicion in adversarial settings." Information Systems Frontiers. 13(1): pp. 21-31. XP019888620, ISSN: 1572-9419, DOI: 10.1007/ S10796-010-9279-4., (Year: 2010).*

(Continued)

*Primary Examiner* — Hani M Kazimi
*Assistant Examiner* — Alison L. Lamb
(74) *Attorney, Agent, or Firm* — Mintz, Levin, Cohn, Ferris, Glovsky and Popeo, P.C; Michael Van Loy; Paul Brockland (57) ABSTRACT

A system and method for programmatically revealing misleading confidence values in Fraud Score is presented to protect artificial intelligence models from adversarial neural networks. The method is used to reduce an adversarial learning neural network model effectiveness. With the score manipulation implemented, the adversary models are shown to systematically become less successful in predicting the true behavior of the Fraud detection artificial intelligence model and what it will flag as fraudulent transactions, thus reducing the true fraud dollars penetrated or taken by adversaries.

17 Claims, 8 Drawing Sheets

(56) References Cited

U.S. PATENT DOCUMENTS

| | | |
|---|---|---|
| 2012/0109821 A1 | 5/2012 | Barbour et al. |
| 2013/0013488 A1 | 1/2013 | Hu et al. |
| 2015/0039512 A1* | 2/2015 | Adjaoute ............. G06Q 20/325 705/44 |
| 2016/0028750 A1* | 1/2016 | Di Pietro ............ H04L 63/1425 726/23 |
| 2017/0270526 A1* | 9/2017 | Fitzgerald .............. G06N 20/00 |

OTHER PUBLICATIONS

Skillicorn, D. (e-published 21 Oct. 2010). "Computational approaches to suspicion in adversarial settings." Information Systems Frontiers. 13(1): pp. 21-31. XP019888620, ISSN: 1572-9419, DOI:10.1007/S10796-010-9279-4.

* cited by examiner

FRAUD SCORE MANIPULATION IN SELF-DEFENSE OF ADVERSARIAL ARTIFICIAL INTELLIGENCE LEARNING

TECHNICAL FIELD

The subject matter described herein relates to fraud detection and, more particularly, fraud detection in defense of predictive technologies including artificial intelligence being attacked by adversarial artificial intelligence models.

BACKGROUND

Fraud management systems have been installed within the financial industry to combat a growing amount of fraud, particularly given the online and electric nature of many financial transactions today, and the ease with which money can be transferred electronically across one or more data communication networks. Fraud management systems are typically used by banks and other financial institutions and usually employ a fraud detection system, which includes computer-implemented processes for monitoring transaction data and scoring transactions for a likelihood of fraud.

For example, FICO's Falcon® platform is presently the leading fraud management solution in the financial industry. The platform automatically processes transaction-related data to generate what is called a Falcon fraud score, which is a score that represents a real-time likelihood of the transaction being fraudulent. However, given the proven effectiveness of fraud management solutions such as the Falcon® platform in fraud detection, cyber criminals and fraudsters can attempt to build adversary models to try to predict the fraud scoring algorithms executed by fraud detection system, or at least discern and exploit the factors used to produce the fraud score. In order to retain the fidelity and widespread use of such fraud management solutions to detect and stop fraud, what is needed are countermeasures in the presence of adversarial artificial intelligence learning attacks targeted on fraud management systems.

SUMMARY

This document describes a system and method to detect and counter artificial intelligence learning attacks on fraud management solutions that use fraud scoring models to generate scores that represent a likelihood of fraud. In some implementations, a system and method includes countermeasures in the presence of adversarial artificial intelligence learning attacks. The countermeasures disclosed herein can include introducing deliberate manipulation in the process of fraud score generation, in order to mislead adversary learning while retaining negligible degradation to the original fraud detection and scoring model used by clients. The disclosure assumes static artificial intelligence models, with a recognition that self-learning AI components such as adaptive analytic modules also further help evade learning.

In some aspects, a system, method and computer program product for countering artificial intelligence learning attacks on fraud scoring models that generate a score to represent a likelihood of fraud are disclosed. The score is in one of a high-score band or one or more low-score bands in a range of scores. In one aspect, the system, method and computer program include one or more data processors to execute a process including the steps of receiving data representing a number of transactions, and scoring each of the plurality of transactions according to a fraud scoring model, the scoring generating a fraud score for each of the number of transactions that corresponds to either the high-score band or the low-score bands, the fraud score representing a likelihood of fraud and having a range that includes at least one operation score threshold that separates the high-score band from the low-score bands. The process includes detecting, using volumetric measurements associated with the data represent the plurality of transactions, the presence of an adversary artificial intelligence model that requests the score for one or more of the plurality of transactions. The process further includes the steps of adjusting, in response to, and possibly independent from, the detecting, the score for at least some of the plurality of transactions in the high-score band, and adjusting, in response to further detecting, the score for at least some of the plurality of transactions in the low-score bands Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The systems and methods described herein include active fraud score manipulation, to counter, and in some cases upon detection of, adversarial artificial intelligence learning attacks. In some implementations, a computerized system is disclosed for AI model detecting adversary AI models by detecting testing transactions. The computerized system uses volumetric measurements to detect an aberrant volume of testing inquiries by an adversary, and/or uses auto-encoder reconstruction error to detect improbable data element distribution in synthetic attack data created by an adversary.

In further implementations, a computerized system is disclosed for AI model-defending from adversary AI models by manipulating scores on transactions. The manipulation can include applying dedicated score adjustment on entities in selected transaction data, and can include a model operation score threshold. The selected transactions can be randomly chosen or based on time sequences, or by any other selection scheme. The score adjustment can be done in each selected score bin, based on transaction dollar information as a criteria, and/or other transaction amount-related variables. In some implementations, the number of selected transactions is a constant for all score bins, or the number of selected transactions is different for different score bins. In some implementations, the score adjustment is performed so as to preserve the original score distribution.

The methods described herein can be applied continuously by any of a number of fraud management systems or fraud scoring methods, or such systems and methods could completely randomize or shuffle scores over the entire score range if a system detects through other means that it is under attack by adverse artificial intelligence (AI) learning.

Such detection of monitoring by an adversary can include detection of an aberrant volume of testing inquires by such adversary, using auto-encoder technology to detect an improbable data element distribution, or using a neural network to detect abnormal behavior in scored transactions. These detection techniques can leverage the use of global profiles where the volume of transactions are monitored for minute, hourly, and daily variations, or by monitoring auto-encoder reconstruction error for determining creation of synthetic attack data as a means of exploring a set of phase space to probe the scoring model's response. Further, these adversary transactions can be seen coming from one postal code, switch, IP address or other entity that the model can monitor for abnormal behavior and volumes as a more obvious indicator to the neural network when it's being attacked. In all the above cases, the fraud detection system produces incorrect outputs to mislead and thwart adversarial AI models on specific transactions deemed to be originated from an adversary, as opposed to legitimate transaction traffic. Such responses by the fraud detection system can be accompanied with error codes and reason codes to alert a bank or other financial institution utilizing the fraud detection system that it is under attack and to ignore output.

Where such drastic actions are not warranted, an alternate implementation includes a method to produce scores correctly in the operating range used by the banks so banking operations are not impacted, but systematically manipulate and change the output scores under the operating range to make it more difficult for an adversary model to predict the fraud scores. Adversary models work to predict the original model score so that criminal elements can more accurately launch attacks and make more money from fraud attempts on card holders and banks by having these transactions score under the fraud alert or case generation score thresholds. This low-impact approach of artificial intelligence models protecting themselves are described herein in the context of fraud models working to defend against adversaries, with the caution as stated above that if volumetric or auto-encoder errors are abnormal, even more forcible manipulation of score output is desirable and can be implemented.

Figure 1:
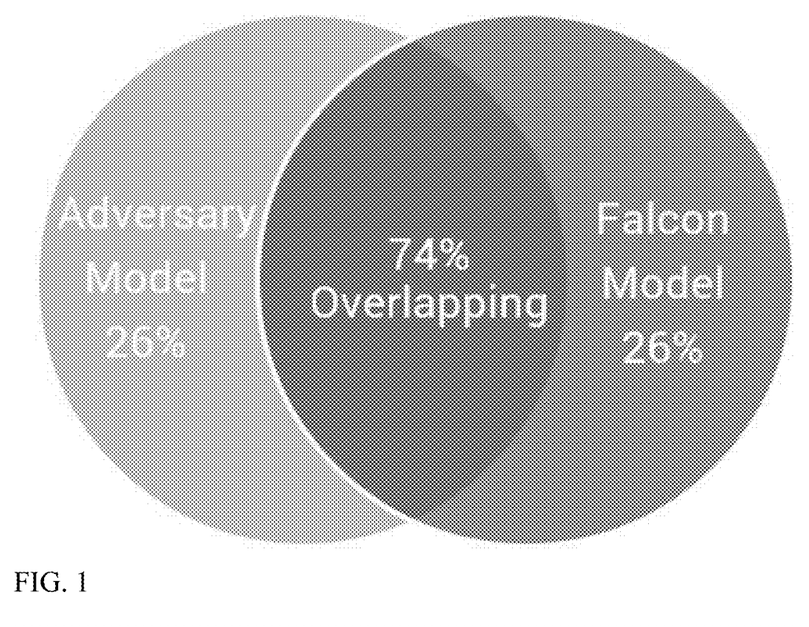
FIG. 1 illustrates an in-time transactions overlap at 1% non-fraud score threshold for a production fraud scoring model and optimistic adversary AI model.
Figure 2:
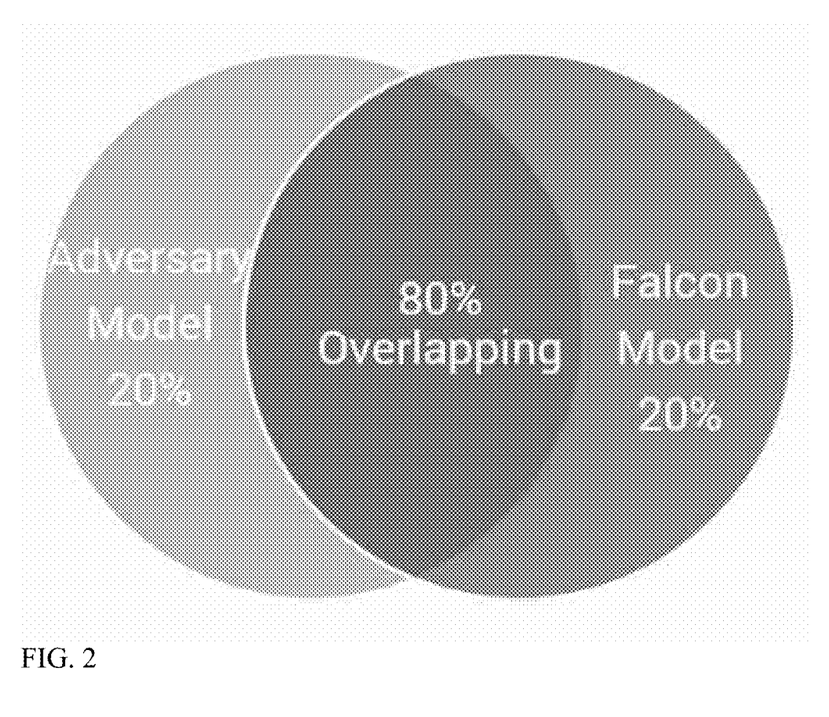
FIG. 2 illustrates an in-time fraud transactions overlap at 1% non-fraud threshold for a production fraud scoring model and optimistic adversary AI model.
Figure 3:
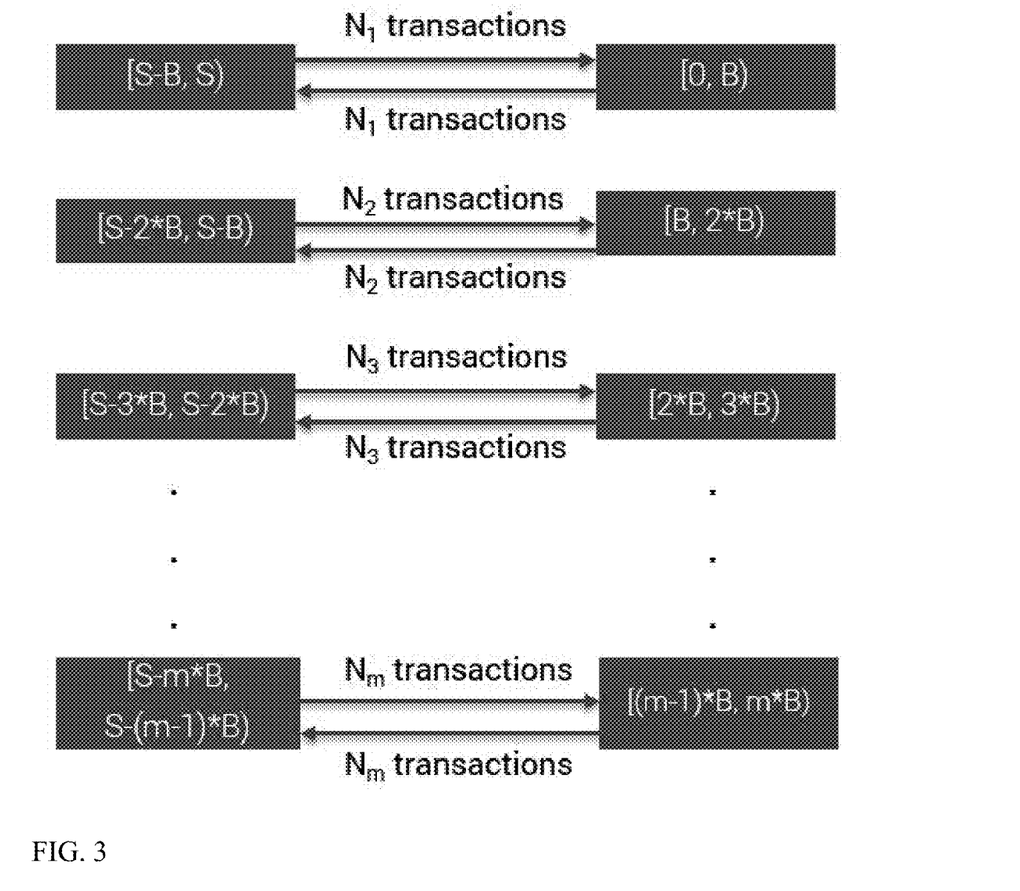
FIG. 3 illustrates a defensive AI score swap diagram assuming operating score threshold S.
Figure 4:
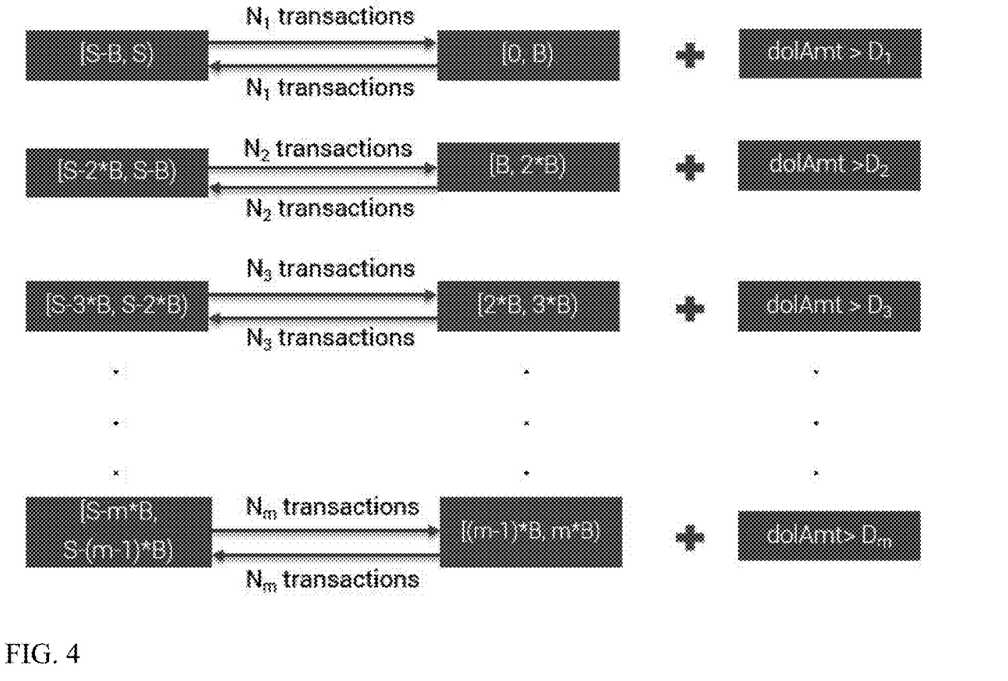
FIG. 4 illustrates an enhanced defensive AI score swap diagram utilizing dollar amount constraints and assuming an operating score threshold S.

In an exemplary implementation, an adversary model was built based on 1 million inquiries to the original Falcon® model neural network model. It was presumed that the adversary does not have the same Falcon specific profiling equations or knowledge of the variable sets. Therefore, only a more simplistic profiling methodology and a set of variables that would be reasonably assumed by criminal data scientists knowledgeable of fraud detection were used in the adversary model build. Since the score distribution of the adversary model was calibrated to original Falcon® model, at any given score threshold there are about the same frauds and non-frauds transactions between the two models. As for the in-time data performance, FIG. 1 shows that at 1% non-fraud score threshold, about 74% of the same transactions appeared in both models. FIG. 2 indicated that for the same score threshold, the adversary model caught 80% of the frauds that Falcon® detected.

In accordance with the exemplary implementation, an adversary model was chosen to be built as strong as possible by taking advantage of knowing the most sensitive data fields for the Falcon® models, training on 1 million actual credit card transactions, which contains realistic probabilistic distribution of critical fields and also, importantly, a realistic time ordering of transactions for specific credit card histories. This would generally be very difficult for an adversary to have access to, which provides an even more optimistic performance of the adversary model. Still, this adversary model can be used to show the power of adversary AI in attacking artificial intelligence models that financial institutions depend upon for business operations, making AI defense strategies against adversary AI a must.

In order to implement deterministic disturbance on confidence values, i.e. fraud scores, transactions can be manipulated from different score bins. This multiple score-bin shuffle assumes the operation score threshold is S and that the score bin is selected to be B score points, then the scores of a randomly picked $N_1$ transactions from high-score band between [(S−B), S) get swapped with those of a randomly selected $N_1$ transactions from low-score band between [0, B). Similarly, the scores of another $N_2$ transactions from [(S−2*B), (S−B)) high-score band get swapped with those of $N_2$ transactions coming from [B, 2*B) low-score band, etc. For the sake of simplicity, we consider herein that $N_1= N_2= \ldots =N_m=N$.

where, $$\text{int}\left(\text{round}\left(\frac{S}{2*B}\right)\right)$$

For example, if S=950 and B=10, then m=48; if S=900 and B=10, then m=45. By doing the above score shuffling, the number of transactions is kept the same between the original fraud score model and the revised fraud score model for any given score band defined in the swap process. This is particularly important, because in production banks rely heavily on an existing score threshold and score distribution for case management, and any change to those settings is undesirable. Further, the transactions that used to be in a high-score band, which most likely means the transactions are fraudulent, are now re-assigned with low-scores which implies a better chance to be predicted as non-fraud transactions. Vice versa, the transactions randomly selected from the low-score band, plausibly being non-frauds, will be swapped to a high-score band with a higher probability to be predicted as frauds. Since all score shuffling is performed below the operation threshold, this adjustment will not affect the fraud scoring model's performance at and above operation threshold.

Furthermore, a monetary constraint can be added to the above score-shuffling procedure by a computing system to mislead adversarial learning even more on critical monetary variables that are used for trying to learn fraudulent behavior—with a view that fraudsters are often more interested in the total dollars fraudulently committed versus a number of fraud transactions. These permutations can become arbitrarily complicated when trying to advertise different values, or types of transactions, that attackers may find most desirable to learn to subvert the fraud scoring model's response.

Figure 5:
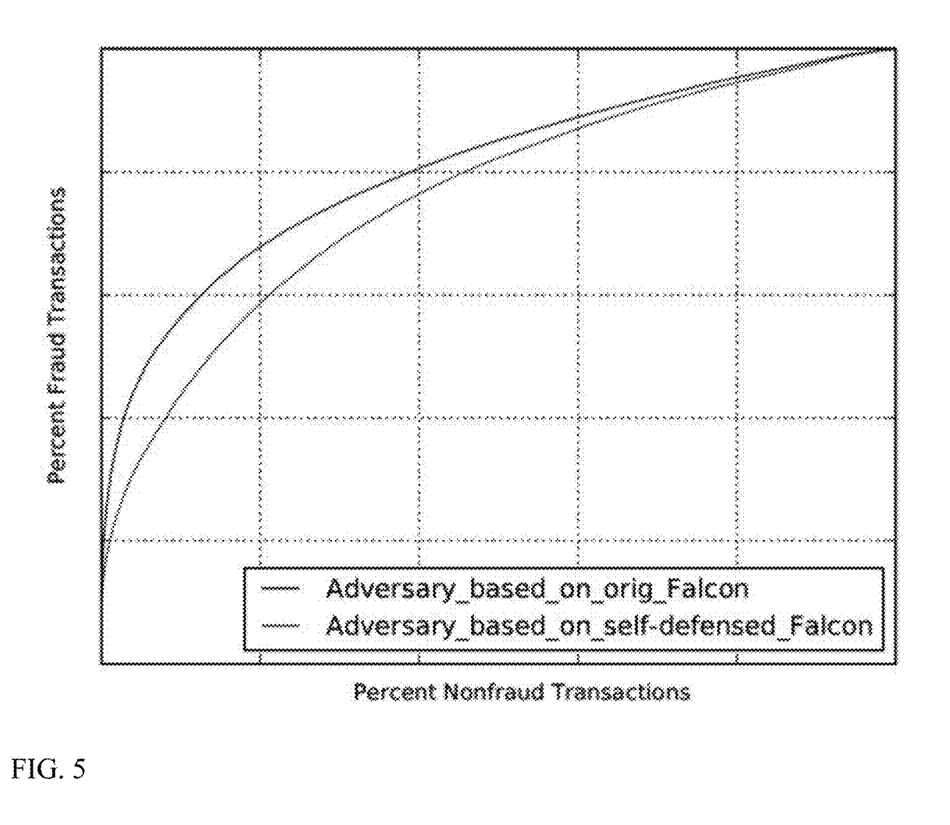
FIG. 5 illustrates a ROC for out-of-time data of an adversary model utilizing real credit-card transaction data and cardholder transaction histories which are overly optimistic in favor of the adversary model.
Figure 6:
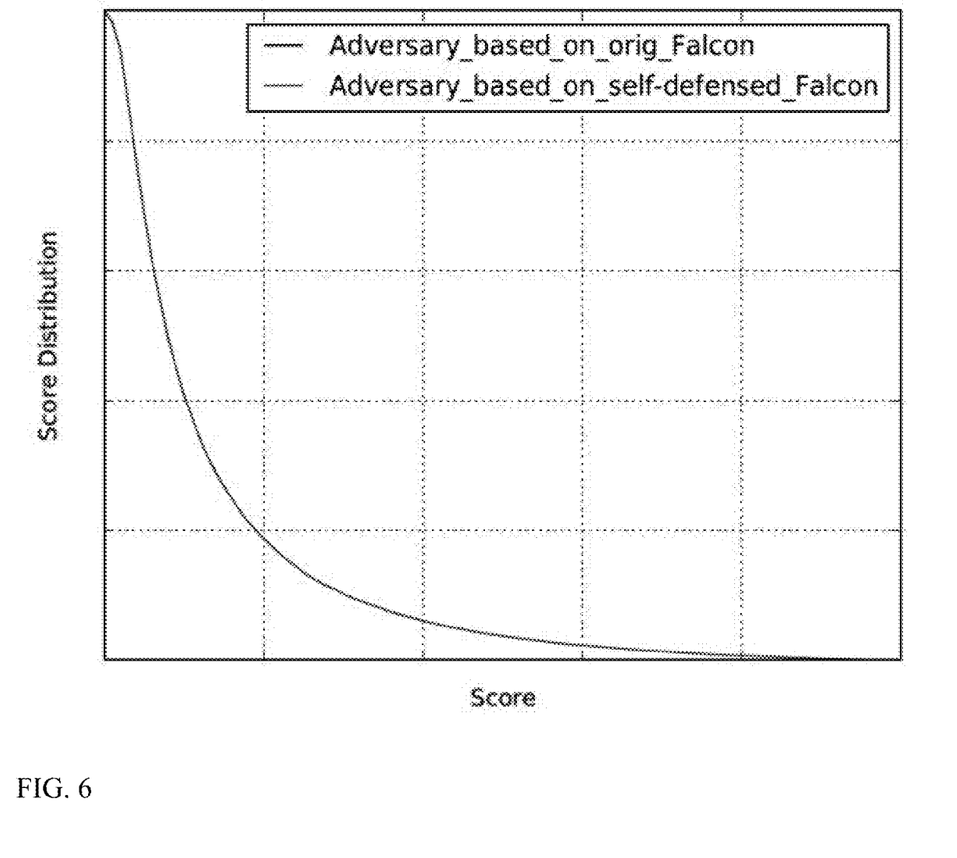
FIG. 6 illustrates a score distribution for out-of-time data utilizing real credit-card transaction data and cardholder transaction histories which are overly optimistic in favor of the adversary model.

The ROC curves shown in FIG. 5 demonstrates that with the above counter-measures, a fraud scoring model can successfully mislead the adversary models and diminish their performance in predicting fraud scores on out-of-time datasets. Again, real credit-card transaction data and cardholder transaction histories are utilized, which are overly optimistic in favor of the adversary model.

Figure 7:
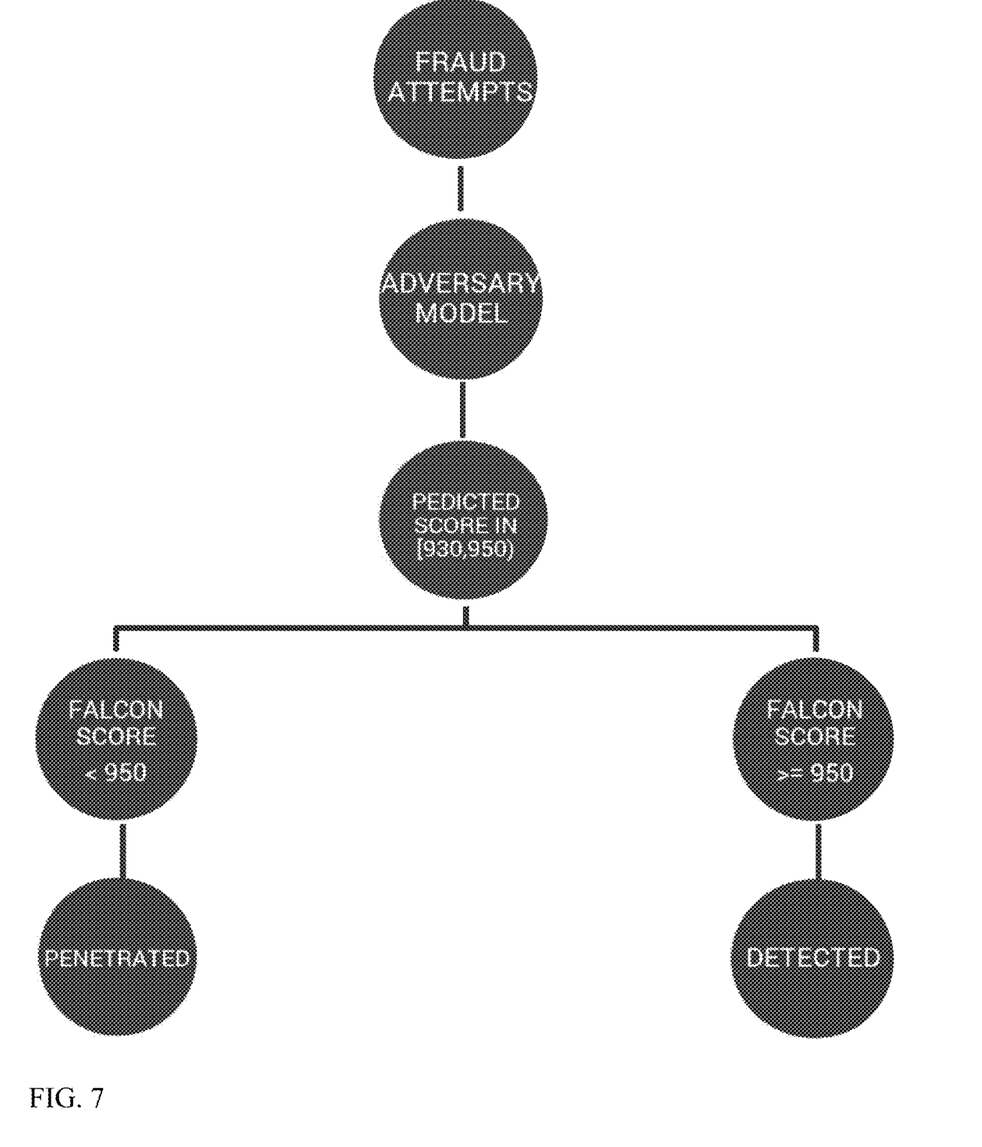
FIG. 7 is a diagram of an adversary's fraud attempts.
Figure 8:
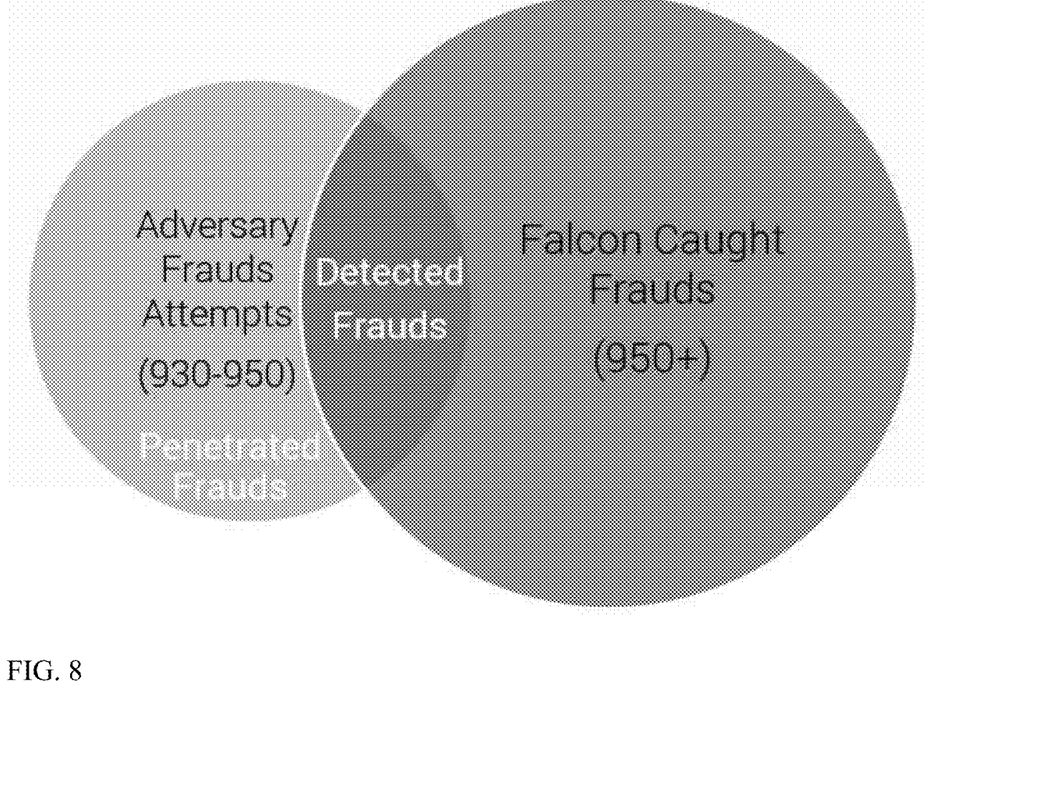
FIG. 8 is a diagram representing penetrated and detected frauds by an adversary model.

Presumably, fraudsters have learned about a fraud scoring model's operating threshold, and aim to launch their fraud attempts right under the model's operating point, so that they can steal more money without being detected by the fraud detection system. FIG. 7 is a flowchart of an exemplary process—assuming the operating score threshold being 950, whereby if a fraud attempt—which was predicted by the adversary model to have a Falcon® score between 930 and 950—gets a Falcon® score below 950 in production, such a fraud is defined as a successful or penetrated fraud attempt. On the contrary, if the fraud attempt ends up being caught by the Falcon® system due to a Falcon® score above 950 in production, then it is a detected fraud attempt. A penetration rate is a ratio of the number of penetrated frauds (or the penetrated fraud dollars) and total number of fraud attempts (or the total fraud dollars) that launch between 930 and 950 predicted by the adversary model, as shown in FIGS. 7 and 8. Therefore, Falcon® models enhanced with the self-defense methodology described herein, are expected to make adversary models less effective in predicting Falcon® scores, thus decreasing the penetration rate and real fraud loss. Those of skill in the art would recognize that the techniques and methodologies described herein can be applied to any fraud scoring model or fraud detection system.

The following table 1 summarizes the adversary model performance before and after fraud score manipulation on out-of-time test data:

| Test Data | Model | N/# of Trnx scored in [940-950) in Training Data | Penetrated Frauds | Detected Frauds | Penetrated Frauds (Dollar-weighted) | Detected Frauds (Dollar-weighted) |
|---|---|---|---|---|---|---|
| Out-of-time | Original Adversary | 0 | 76% | 24% | 73% | 27% |
| | Misled Adversary | 50% | 71% | 29% | 66% | 34% |
| | | 100% | 65% | 35% | 60% | 40% |

As shown in Table 1, when an adversary model is misled by fraud score manipulation, as represented by the percentage of the true transactions in the range of [940-950), the number of fraud transactions and true fraud dollars that penetrated by the adversary model decreases. As has been noted throughout, the adversary AI model was built utilizing real credit-card transaction data and cardholder transaction histories which are overly optimistic in favor of the adversary model.

In the exemplary implementations described herein, the penetration rate by the optimistic adversary model experienced an 11% reduction for out-of-time data. In terms of dollars metrics, the penetration rate decrement was 13% for out-of-time data (roughly 13% less dollars). Note that N is chosen based on the transactions scored between 940 and 950 by the original fraud scoring model, which typically will be one of the score bins with the fewest transactions. The actual number of transactions in a score bin that get score-manipulated also depends on the available transactions in each score bin, especially in the high-score bands. Generally speaking, the more transactions with score manipulation, the more defensive a fraud scoring system will be.

Figure 9:
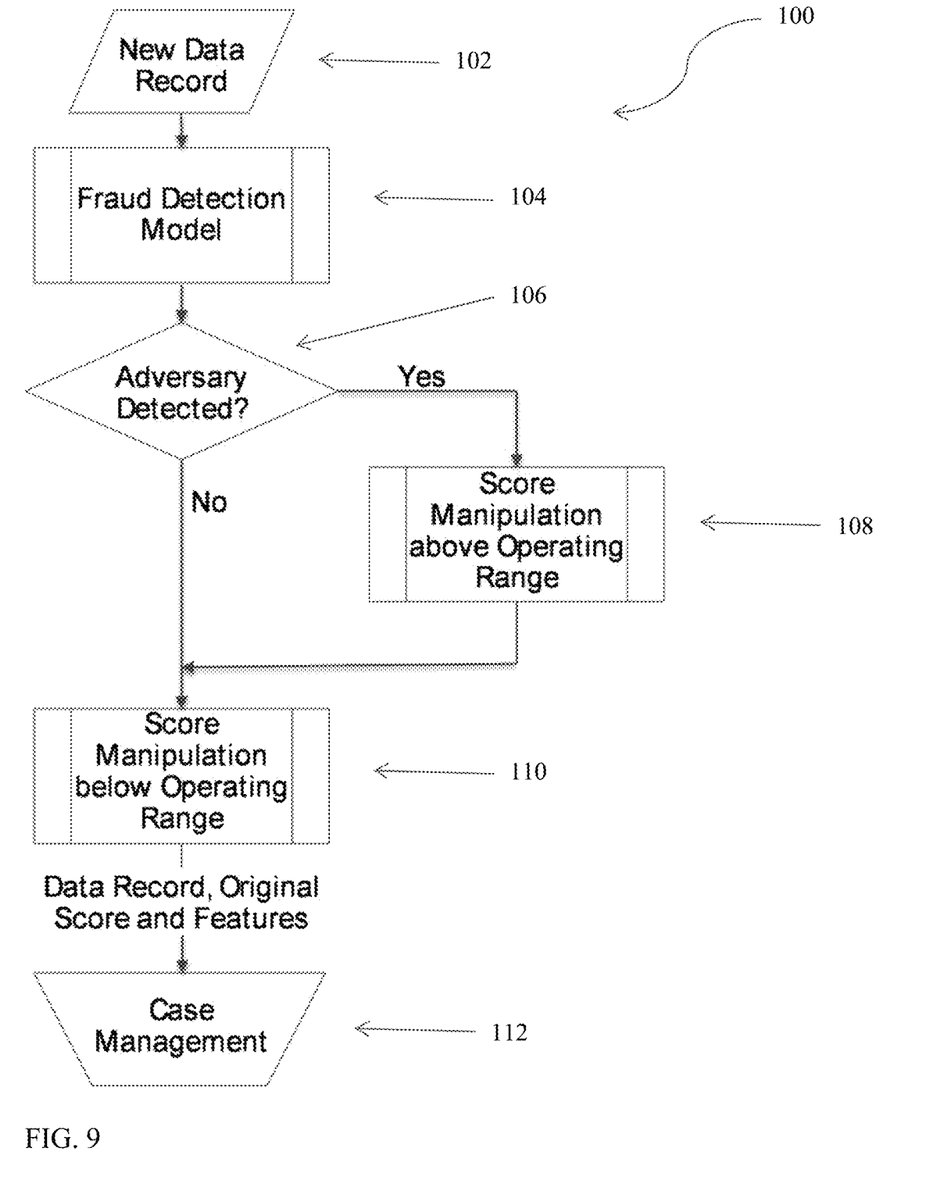
FIG. 9 is a flowchart of a system and method of countering artificial intelligence learning attacks on fraud scoring models that generate a score to represent a likelihood of fraud, the score being in one of a high-score band or one or more low-score bands in a range of scores.

FIG. 9 is a flowchart of a method 100 of countering artificial intelligence learning attacks on fraud scoring models that generate a score to represent a likelihood of fraud. In preferred implementations, the score is within one of a high-score band or within one or more low-score bands in a range of scores. At 102, a new data record is received by a computer processor executing a fraud detection model 104. The new data record can include information about one or more transactions to be scored for fraud by a scoring processor executing the fraud detection model. At 106, the computer processor determines whether an adversary is detected. The adversary can include an artificial intelligence model, typically executed by another computer processor, which requests the score for one or more of the transactions. If an adversary is detected, at 108 the computer processor triggers a potential manipulation of the scores that are—above an operating range or threshold. If no adversary is detected at 106, the computer processor execute, at 110, a potential manipulation that is below the operating range or threshold. The computer processor calculates the data record relating to the operating range, and processes a final score and features of the detected adversary, and sends the data to a case management processor, at 112. The case management processor will then execute a process to counter artificial intelligence learning as described herein.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method of countering artificial intelligence learning attacks on fraud scoring models that generate a fraud score to represent a likelihood of fraud, the fraud score being in one of a high-score band indicative of high likelihood of fraud or one or more low-score bands indicative of low likelihood of fraud in a range of fraud scores, the method comprising:

receiving, by one or more data processors, data representing a plurality of transactions;

scoring, by the one or more data processors, each transaction of the plurality of transactions according to a fraud scoring model, the scoring generating a fraud score for each transaction of the plurality of transactions that corresponds to either the high-score band or the low-score bands, the fraud score representing a likelihood of fraud and having a range that includes an operation fraud score threshold that separates the high-score band from the low-score bands;

detecting, by the one or more data processors using volumetric measurements associated with the data represent the plurality of transactions, a request from an adversary artificial intelligence model for a fraud score based on at least one transaction of the plurality of transactions, wherein the volumetric measurements indicate an aberrant volume of testing inquiries;

adjusting, by the one or more data processors in response to the detecting of the request, the fraud score for at least some of the plurality of transactions above the operation fraud score threshold, wherein adjusting the fraud score further comprises:

swapping, by the one or more data processors, fraud scores of a randomly selected first number of transactions from the plurality of transactions above the operation fraud score threshold with fraud scores of a randomly selected first number of transactions from a plurality of transactions below the operation fraud score threshold in response to detecting one or more adversary scoring requests;

adjusting, by the one or more data processors independent to the detecting, the fraud score for at least some of the plurality of transactions below the operation fraud score threshold;

transmitting, by the one or more data processors and in response to the adjusting, a data record, the data record including features of the detected adversary artificial intelligence model; and executing, in response to the transmitting, a process to counter the adversary artificial intelligence model, wherein the process includes manipulation of the fraud score to mislead the adversary artificial intelligence model, wherein the manipulation includes:

swapping, by the one or more data processors, fraud scores of the randomly selected first number of transactions from the plurality of transactions above the operation fraud score threshold with fraud scores of the randomly selected first number of transactions from the plurality of transactions below the operation fraud score threshold.

2. The computer-implemented method in accordance with claim 1, wherein adjusting the fraud score further comprises:

swapping, by the one or more data processors, fraud scores of a randomly selected second number of transactions from higher-valued transactions below the operation fraud score threshold with fraud scores of a randomly selected second number of transactions from lower-valued fraud scores of the transactions below the operation fraud score threshold.

3. The computer-implemented method in accordance with claim 2, wherein adjusting the fraud score further comprises:

swapping, by the one or more data processors, fraud scores of a randomly selected second number of transactions from higher valued transactions below the operation fraud score threshold with fraud scores of a randomly selected second number of transactions from lower-valued fraud scores in the transactions below the operation fraud score threshold.

4. The computer-implemented method in accordance with claim 1, wherein adjusting the fraud score for at least some of the plurality of transactions is based on one or more transaction amount variables.

5. The computer-implemented method in accordance with claim 1, wherein adjusting the fraud score for at least some of the plurality of transactions preserves an original fraud score distribution generated by the one or more data processors prior to adjusting.

6. A non-transitory computer program product for countering artificial intelligence learning attacks on fraud scoring models that generate a fraud score to represent a likelihood of fraud, the fraud score being in one of a high-score band or one or more low-score bands in a range of fraud scores, the non-transitory computer program product storing instructions that, when executed by at least one programmable processor, cause the at least one programmable processor to perform operations comprising:

receive data representing a plurality of transactions;

score each of the plurality of transactions according to a fraud scoring model, the scoring generating a fraud score for each of the plurality of transactions that corresponds to either the high-score band or the low-score bands, the fraud score representing a likelihood of fraud and having a range that includes an operation fraud score threshold that separates the high-score band from the low-score bands;

detect, using volumetric measurements associated with the data represent the plurality of transactions, a presence of an adversary artificial intelligence model that requests the fraud score for one or more of the plurality of transactions, wherein the volumetric measurements indicate an aberrant volume of testing inquiries;

adjust, in response to the detection, the fraud score for at least some of the plurality of transactions above the operation fraud score threshold, wherein the operations to adjust the fraud score further comprises:

swap fraud scores of a randomly selected first number of transactions from the plurality of transactions above the operation fraud score threshold with fraud scores of a randomly selected first number of transactions from the plurality of transactions below the operation fraud score threshold in response to detecting one or more adversary scoring requests;

adjust, independent to the detection, the fraud score for at least some of the plurality of transactions below the operation fraud score threshold;

transmit, in response to the adjusting, a data record, the data record including features of the detected adversary artificial intelligence model; and execute, in response to the transmitting, a process to counter the adversary artificial intelligence model, wherein the process includes manipulation of the fraud score to mislead the adversary artificial intelligence model, wherein the manipulation includes:

swapping the fraud scores of the randomly selected first number of transactions above the operation fraud score threshold with the fraud scores of the randomly selected first number of transactions below the operation fraud score threshold.

7. The computer program product in accordance with claim 6, wherein the operations to adjust the fraud score further comprises:

swap fraud scores of a randomly selected second number of transactions from higher-valued transactions below the operation fraud score threshold with fraud scores of a randomly selected second number of transactions from lower-valued fraud scores of the transactions below the operation fraud score threshold.

8. The computer program product in accordance with claim 7, wherein the operations to adjust the fraud score further comprises:

swap fraud scores of a randomly selected second number of transactions from higher valued transactions below the operation fraud score threshold with fraud scores of a randomly selected second number of transactions from lower-valued fraud scores in the transactions below the operation fraud score threshold.

9. The computer program product in accordance with claim 6, wherein the operations to adjust the fraud score for at least some of the plurality of transactions is based on one or more transaction amount variables.

10. The computer program product in accordance with claim 6, wherein the operations to adjust the fraud score preserve an original fraud score distribution generated by the at least one programmable processor prior to adjusting.

11. A system for countering artificial intelligence learning attacks on fraud scoring models that generate a fraud score to represent a likelihood of fraud, the fraud score being in one of a high-score band or one or more low-score bands in a range of scores, the system comprising:

at least one programmable processor; and a machine-readable medium storing instructions that, when executed by the at least one programmable processor, cause the at least one programmable processor to perform operations comprising:

receive data representing a plurality of transactions;
score each of the plurality of transactions according to a fraud scoring model, the scoring generating a fraud score for each of the plurality of transactions that corresponds to either the high-score band or the low-score bands, the fraud score representing a likelihood of fraud and having a range that includes an operation score threshold that separates the high-score band from the low-score bands;
detect, using volumetric measurements associated with the data represent the plurality of transactions, a presence of an adversary artificial intelligence model that requests the fraud score for one or more of the plurality of transactions, wherein the volumetric measurements indicate an aberrant volume of testing inquiries;
adjust, in response to the detection, the fraud score for at least some of the plurality of transactions above the operation fraud score threshold, wherein the operations to adjust the fraud score further comprises:
  swap fraud scores of a randomly selected first number of transactions from the plurality of transactions above the operation fraud score threshold with fraud scores of a randomly selected first number of transactions from the plurality of transactions below the operation fraud score threshold;
adjust, independent to the detection, the fraud score for at least some of the plurality of transactions below the operation fraud score threshold;
transmit, in response to the adjusting, a data record, the data record including features of the detected adversary artificial intelligence model; and
execute, in response to the transmitting, a process to counter the adversary artificial intelligence model, wherein the process includes manipulation of the fraud score to mislead the adversary artificial intelligence model, wherein the manipulation includes:
  swapping the fraud scores of the randomly selected first number of transactions above the operation fraud score threshold with the fraud scores of the randomly selected first number of transactions below the operation fraud score threshold.

12. The system in accordance with claim 11, wherein the at least one programmable processor is further configured to:
  swap fraud scores of a randomly selected second number of transactions from higher-valued transactions below the operation fraud score threshold with fraud scores of a randomly selected second number of transactions from lower-valued fraud scores of the transactions below the operation fraud score threshold.

13. The system in accordance with claim 12, wherein the at least one programmable processor is further configured to:
  swap fraud scores of a randomly selected second number of transactions from higher valued transactions below the operation fraud score threshold with fraud scores of a randomly selected second number of transactions from lower-valued fraud scores in the transactions below the operation fraud score threshold.

14. The system in accordance with claim 11, wherein the at least one programmable processor is further configured to adjust the fraud score for at least some of the plurality of transactions is based on one or more transaction amount variables.

15. The system in accordance with claim 11, wherein the at least one programmable processor is further configured to preserve an original score distribution generated by at least one programmable processor prior to adjusting following a fraud score adjustment operation.

16. The system in accordance with claim 1, wherein the adjusting the fraud score includes swapping a first fraud score randomly selected from the high-score band or the low-score band with a second fraud score randomly selected from the low-score band.

17. The system in accordance with claim 1, further comprising:
  presenting data associated with the adjusted fraud score to the adversary artificial intelligence model.

* * * * *